(12) United States Patent
Sohn et al.

(10) Patent No.: US 10,305,136 B2
(45) Date of Patent: May 28, 2019

(54) ELECTRODE ASSEMBLY AND LITHIUM BATTERY INCLUDING THE SAME

(71) Applicant: SAMSUNG SDI CO., LTD., Yongin-si, Gyeonggi-do (KR)

(72) Inventors: Juhee Sohn, Yongin-si (KR); Junwon Suh, Yongin-si (KR); Jeong-Doo Yi, Yongin-si (KR); Bongkyoung Park, Yongin-si (KR); Hyunhwa Song, Yongin-si (KR); Seokhun Hong, Yongin-si (KR); JuHyeong Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 251 days.

(21) Appl. No.: 15/167,791

(22) Filed: May 27, 2016

(65) Prior Publication Data

US 2016/0372780 A1    Dec. 22, 2016

(30) Foreign Application Priority Data

Jun. 18, 2015 (KR) .................. 10-2015-0086606

(51) Int. Cl.
*H01M 10/04* (2006.01)
*H01M 4/66* (2006.01)
(Continued)

(52) U.S. Cl.
CPC ..... *H01M 10/0413* (2013.01); *H01M 4/0404* (2013.01); *H01M 4/131* (2013.01);
(Continued)

(58) Field of Classification Search
CPC .............. H01M 10/0413; H01M 4/80; H01M 10/0418; H01M 10/0585; H01M 4/0404;
(Continued)

(56) References Cited

U.S. PATENT DOCUMENTS 5,795,680 A * 8/1998 Ikeda .................. H01M 2/0222
429/235
6,740,454 B1 * 5/2004 Ando .................... H01M 4/137
429/231.95
(Continued)

FOREIGN PATENT DOCUMENTS

EP        3067978 A1    9/2016
JP        5641593 B2    12/2014
(Continued)

OTHER PUBLICATIONS

EPO Extended Search Report dated Aug. 4, 2016, for corresponding European Patent Application No. 16175107.8 (7 pages).
(Continued)

*Primary Examiner* — Lisa S Park
(74) *Attorney, Agent, or Firm* — Lewis Roca Rothgerber Christie LLP

(57) ABSTRACT

A stack-type electrode assembly includes a lowermost electrode in a lowermost portion of the electrode assembly; an uppermost electrode in an uppermost portion of the electrode assembly; at least one unit stack between the lowermost electrode and the uppermost electrode, the at least one unit stack comprising a positive electrode, a negative electrode, and a separator disposed between the positive electrode and the negative electrode; and a plurality of separators between the lowermost electrode and unit stack, between the unit stacks, and between the unit stack and the uppermost electrode.

16 Claims, 8 Drawing Sheets

(51) Int. Cl.
*H01M 4/80* (2006.01)
*H01M 4/04* (2006.01)
*H01M 4/131* (2010.01)
*H01M 4/133* (2010.01)
*H01M 10/0525* (2010.01)
*H01M 10/0585* (2010.01)
*H01M 2/02* (2006.01)
*H01M 4/525* (2010.01)
*H01M 4/587* (2010.01)
*H01M 4/62* (2006.01)
*H01M 4/02* (2006.01)

(52) U.S. Cl.
CPC .......... *H01M 4/133* (2013.01); *H01M 4/661* (2013.01); *H01M 4/80* (2013.01); *H01M 4/808* (2013.01); *H01M 10/0418* (2013.01); *H01M 10/0525* (2013.01); *H01M 10/0585* (2013.01); *H01M 2/0275* (2013.01); *H01M 4/0433* (2013.01); *H01M 4/525* (2013.01); *H01M 4/587* (2013.01); *H01M 4/621* (2013.01); *H01M 10/044* (2013.01); *H01M 2004/021* (2013.01); *H01M 2004/025* (2013.01); *H01M 2004/029* (2013.01); *Y02T 10/7011* (2013.01)

(58) Field of Classification Search
CPC .. H01M 4/133; H01M 10/0525; H01M 4/808; H01M 4/131; H01M 4/661; H01M 2004/029; H01M 2004/025; H01M 4/587; H01M 4/525; H01M 4/621; H01M 2/0275; H01M 4/0433; H01M 2004/021; H01M 10/044; Y02T 10/7011

See application file for complete search history.

(56) References Cited

U.S. PATENT DOCUMENTS

| | | | |
|---|---|---|---|
| 2013/0065122 A1* | 3/2013 | Chiang | H01M 4/0478 429/211 |
| 2013/0252091 A1 | 9/2013 | Huang | |
| 2013/0252092 A1 | 9/2013 | Huang | |
| 2013/0295465 A1 | 11/2013 | Kaneko et al. | |
| 2014/0147731 A1* | 5/2014 | Anastas | H01M 2/1653 429/163 |
| 2015/0280212 A1 | 10/2015 | Son et al. | |

FOREIGN PATENT DOCUMENTS

| | | |
|---|---|---|
| KR | 10-0559364 B1 | 3/2006 |
| KR | 10-2015-0014637 A | 2/2015 |
| KR | 10-2015-0028457 A | 3/2015 |
| KR | 10-2015-0030157 | 3/2015 |
| KR | 10-2015-0033854 A | 4/2015 |
| WO | WO 2015/016479 A1 | 2/2015 |

OTHER PUBLICATIONS

Korean Patent Abstracts for Korean Pub. No. 10-2004-0096381 A, dated Nov. 16, 2004, for corresponding KR 10-0559364 B1, 1 page.
EPO Office Action dated May 17, 2017, for corresponding European Patent Application No. 16175107.8 (6 pages).

* cited by examiner

ELECTRODE ASSEMBLY AND LITHIUM BATTERY INCLUDING THE SAME

CROSS-REFERENCE TO RELATED APPLICATION

This application claims priority to and the benefit of Korean Patent Application No. 10-2015-0086606, filed on Jun. 18, 2015, in the Korean Intellectual Property Office, the disclosure of which is incorporated herein in its entirety by reference.

BACKGROUND

1. Field

One or more exemplary embodiments relate to an electrode assembly and a lithium battery including the electrode assembly.

2. Description of the Related Art

Unlike primary batteries that are generally not chargeable, secondary batteries are chargeable and dischargeable, and consequently, are widely used in a variety of small-sized high-tech electronic devices such as digital cameras, mobile devices, and laptop computers. Medium to large-sized batteries have been developed as well, and, particularly, secondary batteries having high capacity and safety have been manufactured due to wide use of electric vehicles (EVs).

Examples of a secondary battery may include a nickel-cadmium battery, a nickel-metal hydride battery, a nickel-hydrogen battery, and a lithium secondary battery. A plurality of lithium secondary batteries may be connected in series to have a high output and used for EVs, and this arrangement has a high driving voltage compared to that of a nickel-cadmium battery or a nickel-metal hydride battery. The lithium secondary batteries connected in series have excellent energy density characteristics per unit weight and thus their use has increased.

Therefore, a lithium second battery having high energy density while having high capacity is needed.

SUMMARY

One or more exemplary embodiments include a stack-type electrode assembly, in which a 3-dimensional (3D) porous current collector-including electrode is located in an uppermost portion (e.g., top) and/or in a lowest portion (e.g., bottom) in the electrode assembly.

One or more exemplary embodiments include a lithium battery having high capacity and energy density by including the stack-type electrode assembly.

Additional aspects will be set forth in part in the description which follows and, in part, will be apparent from the description, or may be learned by practice of the presented embodiments.

According to one or more exemplary embodiments, a stack-type electrode assembly includes a lowest electrode in a lowermost portion of the electrode assembly; an uppermost electrode in an uppermost portion of the electrode assembly; at least one unit stack between the lowermost electrode and the uppermost electrode, the at least one unit stack including a positive electrode; a negative electrode; and a separator disposed between the positive electrode and the negative electrode; and a plurality of separators between the lowermost electrode and the unit stack, between the unit stacks, and between the unit stack and the uppermost electrode, wherein the lowermost electrode or the uppermost electrode is an electrode including a 3-dimensional (3D) porous current collector.

In some embodiments, the lowermost electrode and the uppermost electrode both comprise the 3D porous current collector.

In some embodiments, the electrode including the 3D porous current collector may further include an electrode active material in pores of the 3D porous current collector.

In some embodiments, the lowermost electrode or the uppermost electrode may be an electrode that does not include the 3D porous current collector and may include a non-porous electrode current collector; and an electrode active material layer that is disposed on at least one surface of the non-porous electrode current collector.

In some embodiments, the non-porous electrode current collector may be in the form of a metal foil.

In some embodiments, the unit stack may have a bi-cell structure, wherein the bi-cell structure includes the negative electrode, the separator, the positive electrode, a second separator, and a second negative electrode that are sequentially stacked in this stated order, or wherein the bi-cell structure includes the positive electrode, the separator, the negative electrode, the second separator, and a second positive electrode that are sequentially stacked in this stated order.

In some embodiments, the unit stack may have a full-cell structure, wherein the full-cell structure includes the positive electrode, the separator, and a negative electrode that are sequentially stacked in this stated order, or wherein the full-cell structure includes the negative electrode, the separator, and the positive electrode that are sequentially stacked in this stated order.

In some embodiments, the electrodes having opposite polarities may be stacked to face each other with the separator therebetween.

In some embodiments, at least one of the electrodes of the unit stack may be an electrode including the 3D porous current collector.

In some embodiments, the stack-type electrode assembly may include a plurality of unit stacks, wherein each of the unit stacks includes an electrode including the 3D porous current collector, wherein each of the electrodes including the 3D porous current collector of each of the unit stacks has a consecutively stacked structure and wherein a separator of the separators is between the unit stacks.

In some embodiments, the stack-type electrode assembly may include a plurality of unit stacks, wherein each of the unit stacks includes an electrode including the 3D porous current collector, wherein each of the electrodes including the 3D porous current collector of each of the unit stacks has a consecutively stacked structure without the separator between the unit stacks, and wherein the consecutively stacked electrodes including the 3D porous current collector have the same polarity.

In some embodiments, the 3D porous current collector may be a metal foam.

In some embodiments, the 3D porous current collector may include at least one selected from aluminum (Al), titanium (Ti), vanadium (V), chromium (Cr), manganese (Mn), iron (Fe), cobalt (Co), nickel (Ni), copper (Cu), zinc (Zn), zirconium (Zr), niobium (Nb), silver (Ag), tungsten (W), platinum (Pt), steel use stainless (SUS), and a combination thereof.

In some embodiments, when the electrode including the 3D porous current collector is a negative electrode, the 3D porous current collector may include Cu foam, and, when the electrode including the 3D porous current collector is a positive electrode, the 3D porous current collector may include Al foam.

In some embodiments, a thickness of the 3D porous current collector may be in a range of about 10 μm to about 500 μm.

In some embodiments, a thickness of the 3D porous current collector may be in a range of about 50 μm to about 200 μm.

In some embodiments, a pore diameter of the 3D porous current collector may be in a range of about 0.2 μm to about 100 μm.

In some embodiments, a porosity of the 3D porous current collector may be in a range of about 50% to about 98%.

In some embodiments, the stack-type electrode assembly may include one or two unit stacks.

According to one or more exemplary embodiments, the lithium battery includes the stack-type electrode assembly.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
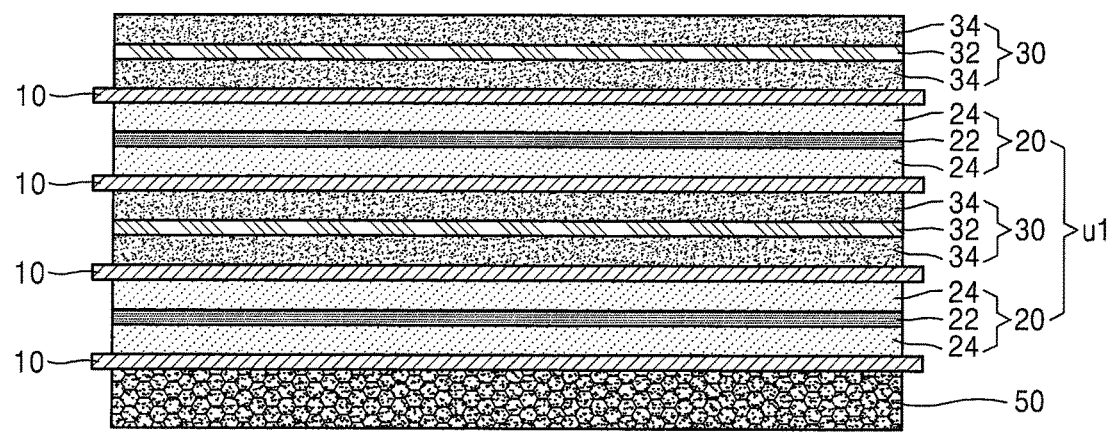
FIGS. 1, 2, 3, 4, 5, and 6 are schematic views of a structure of an electrode assembly according to an exemplary embodiment of the present invention.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As aspects of the present invention allow for various changes and numerous embodiments, particular embodiments will be illustrated in the drawings and described in detail in the written description. However, this is not intended to limit the inventive concept to particular modes of practice, and it is to be appreciated that all changes, equivalents, and substitutes that do not depart from the spirit and technical scope are encompassed in the inventive concept. In the description, certain detailed explanations of the related art are omitted when it is deemed that they may unnecessarily obscure the essence of the inventive concept. While such terms as "first," "second," etc., may be used to describe various components, such components must not be limited to the above terms. The above terms are used only to distinguish one component from another. The terms used in the present specification are merely used to describe particular embodiments, and are not intended to limit the inventive concept. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. Also, the symbol "/" used herein may be interpreted as "and" or "or" according to the context.

In the drawings, the thicknesses of layers and regions may be exaggerated for clarity. Like reference numerals in the drawings denote like elements throughout. It will be understood that when a component, such as a layer, a film, a region, or a plate, is referred to as being "on" another component, the component can be directly on the other component or intervening components may be present thereon.

Hereinafter, the inventive concept will be described more fully with reference to the accompanying drawings, in which exemplary embodiments of the inventive concept are shown. This inventive concept may, however, be embodied in many different forms and should not be construed as limited to the exemplary embodiments set forth herein. Rather, these embodiments are provided so that this disclosure will be thorough and complete, and will fully convey the scope of the inventive concept to one of ordinary skill in the art. Sizes of components in the drawings may be exaggerated for convenience of explanation. In other words, because sizes and thicknesses of components in the drawings are arbitrarily illustrated for convenience of explanation, the following embodiments are not limited thereto.

Generally, a lithium battery is manufactured by accommodating an electrode assembly in a case having a shape of a rectangle (or rectangular prism), a cylinder, or a pouch and injecting an electrolyte solution thereto. The electrode assembly may be classified into a jelly-roll type, which is manufactured by disposing a separator between a positive electrode and a negative electrode having a long sheet shape to prepare a stack and rolling the stack; or a stack-type, which is manufactured by sequentially stacking a plurality of positive electrodes and negative electrodes having a same size (e.g., a predetermined size), wherein a separator is interposed between the positive electrode and negative electrode (e.g., between each positive and negative electrode), according to a structure of the electrode assembly.

In the stack-type electrode assembly, an electrode is placed at an outermost side (e.g., at the ends of the stack), e.g., an uppermost (or top) side or a lowermost (or bottom or lowest) side, and the electrode may have a non-reactive region where intercalation/deintercalation of lithium ions does not occur, and thus an irreversible capacity may increase. The increase in the irreversible capacity deteriorates lifetime characteristics of a lithium battery, and thus a lithium battery can be improved by decreasing or reducing the irreversible capacity of the electrode.

In this regard, as a result of examining a method to decrease or reduce an irreversible capacity of the electrode, it was confirmed that a battery having decreased (or reduced) irreversible capacity and increased energy density may be manufactured by constructing an uppermost (or top) and/or lowermost (or bottom or lowest) electrode of the stack-type electrode assembly differently from other electrodes located in the electrode assembly.

Hereinafter, one or more exemplary embodiments of the present invention will be described.

The stack-type electrode assembly according to an embodiment includes a lowermost electrode (or bottom electrode) located in a lowermost portion in the electrode assembly (e.g., at the bottom of the electrode assembly); an uppermost electrode (or top electrode) located in an uppermost portion in the electrode assembly (e.g., at the top of the electrode assembly); at least one unit stack located between the lowermost electrode and the uppermost electrode and includes a positive electrode; a negative electrode; and a separator disposed between the positive electrode and the negative electrode; and separators that are each disposed between the lowermost electrode and the unit stack, between the unit stacks, and between the unit stack and uppermost electrode, wherein the lowermost electrode or the uppermost electrode is a 3-dimensional (3D) porous current collector including electrode.

Here, the electrode may be a positive electrode or a negative electrode, and the electrodes that are stacked with the separator therebetween may have opposite polarities. In other words, the electrode assembly may have a stack structure sequentially including a positive electrode, a separator, and a negative electrode in this stated order or a stack structure sequentially including a negative electrode, a separator, and a positive electrode in this stated order.

For example, the lowermost electrode and the uppermost electrode may both be a 3D porous current collector including electrode.

In the electrode assembly, the electrode including the 3D porous current collector may further include an electrode active material in pores of the 3D porous current collector.

Here, the 3D porous current collector is different from a current collector that does not have pores (e.g., a comparative current collector), such as a foil-shaped thin film. The 3D porous current collector refers to a current collector having pores that are 3-dimensionally connected therein. The 3D porous current collector-including electrode may have a structure including an electrode active material in the pores of the 3D porous current collector.

In the electrode assembly, electrodes other than the 3D porous current collector-including electrode may include a non-porous electrode current collector, for example, a metal thin film, and an electrode active material layer disposed on at least one surface of the non-porous electrode current collector. For example, the electrode not including the 3D porous current collector may have a layered structure including the current collector and the electrode active material layer that are sequentially stacked, and thus the electrode may have a different structure from that of the 3D porous current collector-including electrode in which a negative active material or a positive active material is included in the pores of the 3D porous current collector.

When the stack-type electrode assembly only includes the electrode not including the 3D porous current collector, an irreversible capacity thereof increases due to a non-reactive region of the lowermost electrode or the uppermost electrode, as described above. Thus, in order to mitigate or prevent the increase in irreversible capacity, only electrodes that do not have an active material layer disposed in the lowermost or uppermost portion in the assembly may be used, e.g., the electrodes having an active material only on a cross-sectional surface of the current collector may be used. However, a curving phenomenon, in which an electrode plate may be curved, may occur during a roll-pressing process when only the electrodes that do not have an active material layer disposed in an lowermost or a uppermost portion in the assembly are used.

On the other hand, as described above, when a battery that has the 3D porous current collector-including electrode as the uppermost electrode or the lowermost electrode is used, the curving phenomenon may not occur (e.g., the curving phenomenon may be mitigated or prevented), and a decrease in capacity due to the non-reactive region of the uppermost electrode or the lowermost electrode may not occur (or may be mitigated). Therefore, the battery may have increased capacity and energy density compared to a battery including a stack-type electrode assembly that only includes electrodes not including a 3D porous current collector.

The unit stack may have a full-cell structure which includes a positive electrode, a separator, and a negative electrode (or a negative electrode, a separator, and a positive electrode) that are sequentially stacked in this stated order.

Alternatively, the unit stack may have a bi-cell structure which includes a negative electrode, a separator, a positive electrode, a separator, and a negative electrode (or a positive electrode, a separator, a negative electrode, a separator, and a positive electrode) that are sequentially stacked in this stated order.

Figure 2:
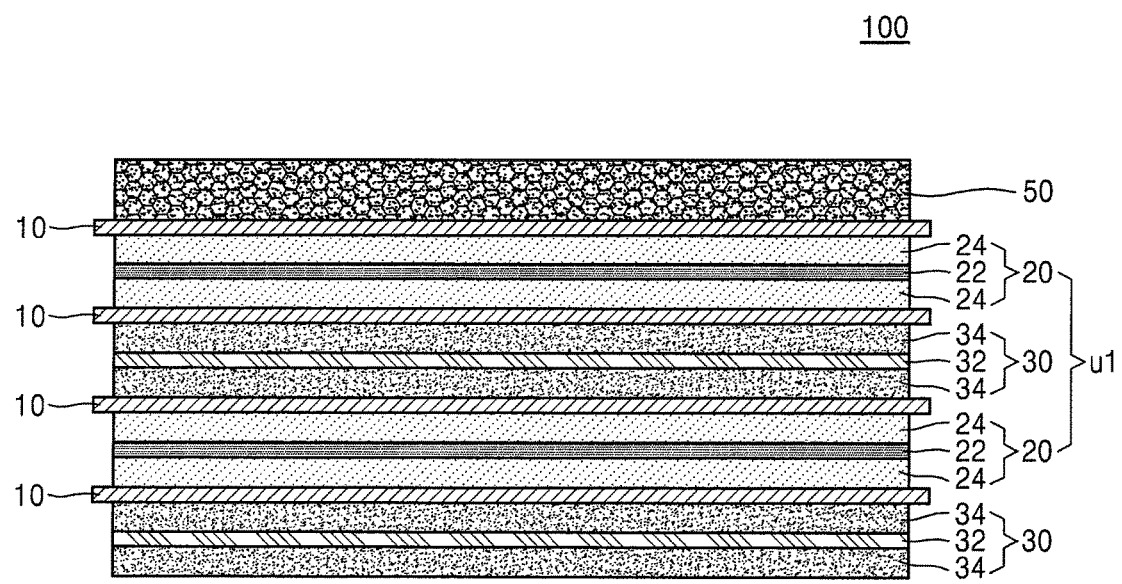
Figure 3:
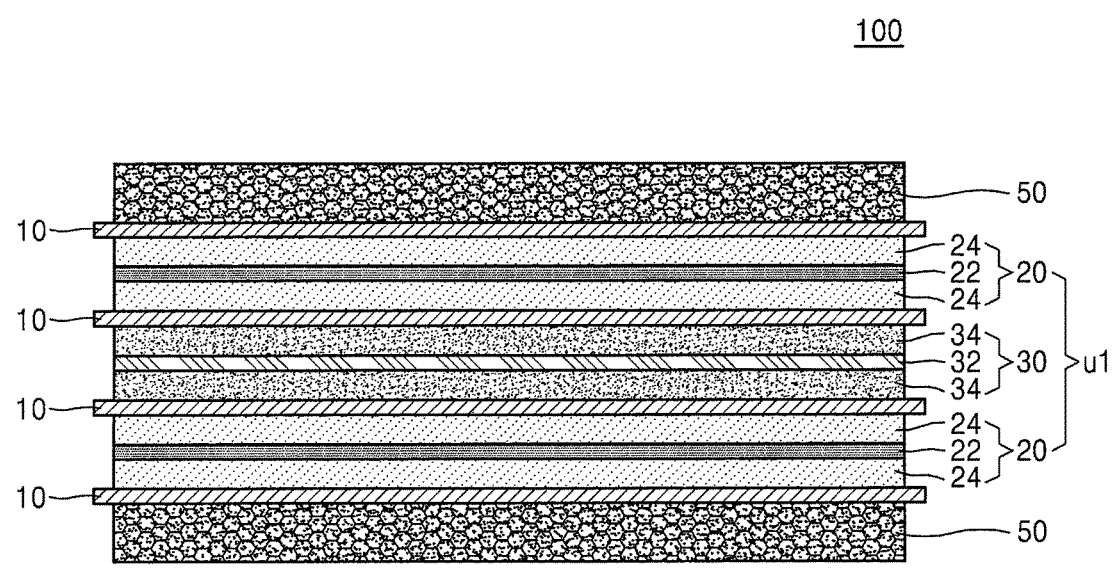
Figure 4:
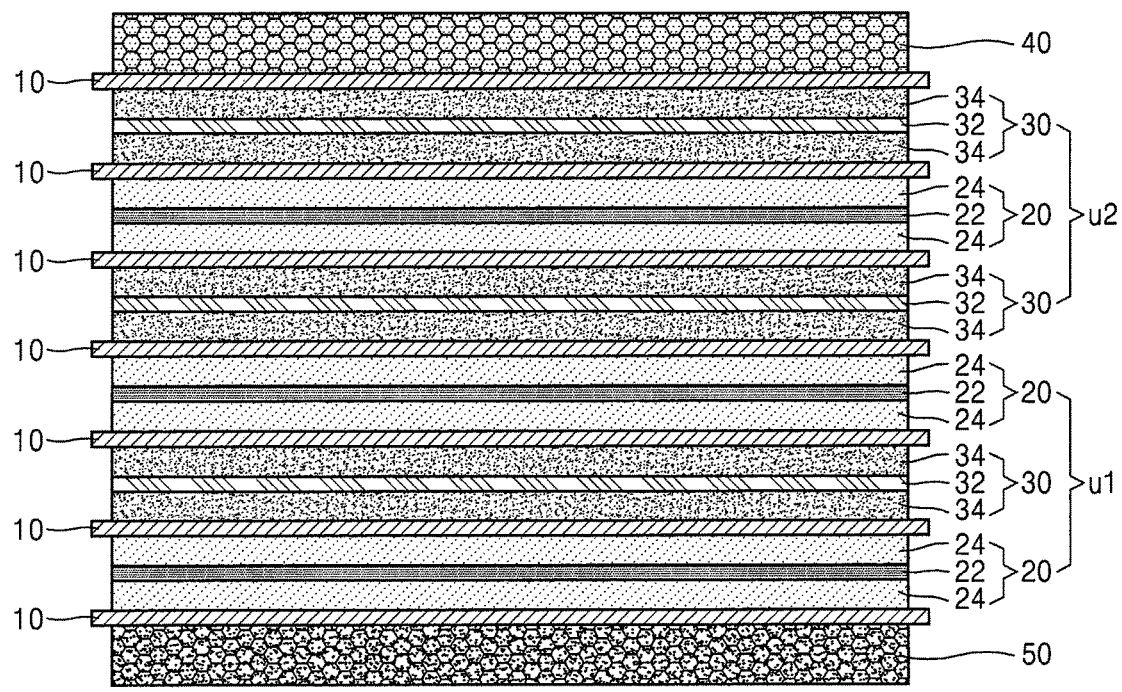
Figure 5:
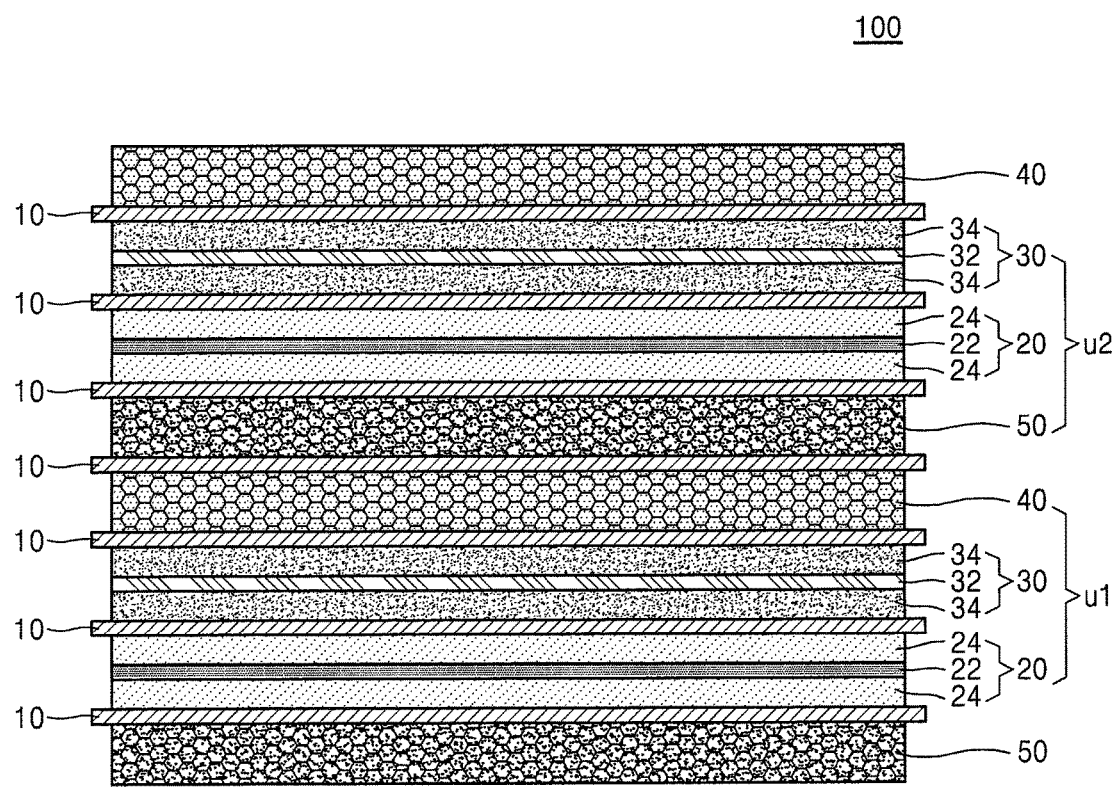
Figure 6:
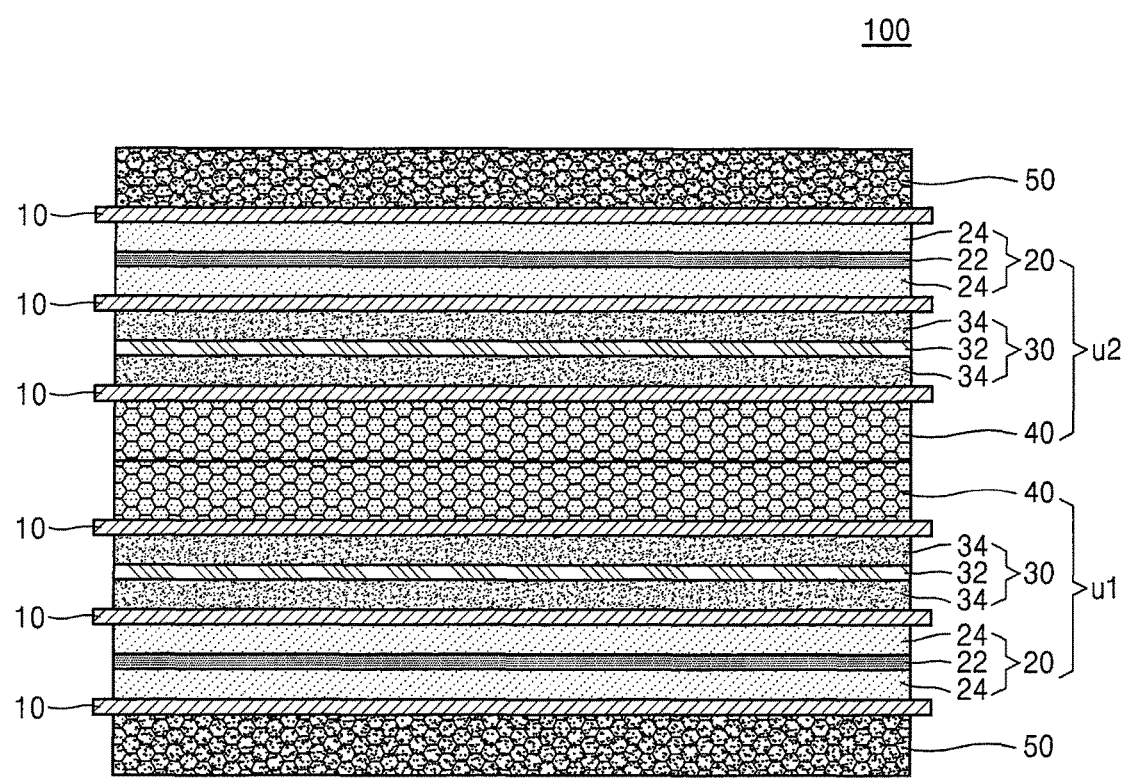

Hereinafter, one or more exemplary embodiments will be described with reference to drawings. FIGS. 1, 2, 3, 4, 5, and 6 are cross-sectional views schematically illustrating a stack-type electrode assembly 100 (hereinafter, referred to as the electrode assembly) according to an exemplary embodiment of the present invention. Referring to FIGS. 1, 2, and 3, the electrode assembly 100 may include a lowermost (or bottom) electrode, an uppermost (or top) electrode, and one unit stack disposed between the lowermost electrode and the uppermost electrode. Referring to FIGS. 4, 5, and 6, the electrode assembly 100 may include a lowermost (or bottom) electrode, an uppermost (or top) electrode, and two unit stacks that are disposed between the lowermost electrode and the uppermost electrode.

As shown in FIG. 1, the lowermost (or bottom) electrode of the electrode assembly 100 may be a 3D porous current collector-including negative electrode 50. The electrode assembly 100 may have a sequentially stacked structure of the 3D porous current collector-including negative electrode 50/a separator 10/a unit stack U1 including a positive electrode 20, a separator 10, a negative electrode 30, a separator 10, and the positive electrode 20 that are sequentially stacked in this stated order/a separator 10/a negative electrode 30.

In some embodiments of the present invention, the electrode assembly 100 may have a sequentially stacked structure of a 3D porous current collector-including positive electrode 40/the separator 10/the unit stack U1 including the negative electrode 30, the separator 10, the positive electrode 20, the separator 10, and the negative electrode 30 that are sequentially stacked in this stated order/the separator 10/the positive electrode 20.

Here, the electrode assemblies 100 may have a stacked structure in a manner that electrodes having opposite polarities may face each other with the separator 10 therebetween.

The positive electrode 20 may include a non-porous positive electrode current collector 22 and positive active material layers 24 that are disposed on two surfaces of the positive electrode current collector 22. The negative electrode 30 may include a non-porous negative electrode current collector 32 and negative active material layers 34 that are disposed on two surfaces of the negative electrode current collector 32.

As shown in FIG. 2, the uppermost electrode of the electrode assembly 100 may be the 3D porous current collector-including negative electrode 50. The electrode assembly 100 may have a sequentially stacked structure of the negative electrode 30/the separator 10, the unit stack including the positive electrode 20, the separator 10, the negative electrode 30, the separator 10, and the positive electrode 20 that are sequentially stacked in this stated order/the separator 10/the 3D porous current collector-including negative electrode 50.

In some embodiments of the present invention, the electrode assembly 100 may have a sequentially stacked structure of the positive electrode 20/the separator 10/the unit stack U1 including the negative electrode 30, the separator 10, the positive electrode 20, the separator 10, and the negative electrode 30 that are sequentially stacked in this stated order/the separator 10/the 3D porous current collector-including positive electrode 40.

As shown in FIG. 3, the uppermost electrode and the lowermost electrode of the electrode assembly 100 may both be negative electrodes 50 each including the 3D porous current collector. The electrode assembly 100 may have a sequentially stacked structure of the 3D porous current collector-including negative electrode 50/the separator 10/the unit stack U1 including the positive electrode 20, the separator 10, the negative electrode 30, the separator 10, and the positive electrode 20 that are sequentially stacked in this stated order/the separator 10/the 3D porous current collector-including negative electrode 50.

In some embodiments of the present invention, the electrode assembly 100 may have a sequentially stacked structure of the positive electrode 40 including the 3D porous current collector/the separator 10/the unit stack U1 including the negative electrode 30, the separator 10, the positive electrode 20, the separator 10, and the negative electrode 30 that are sequentially stacked in this stated order/the separator 10/the 3D porous current collector-including positive electrode 40.

As shown in FIG. 4, the electrode assembly 100 may include the 3D porous current collector-including electrodes as both the uppermost electrode and the lowermost electrode and two unit stacks U1 and U2. The electrode assembly 100 may have a sequentially stacked structure of the 3D porous current collector-including negative electrode 50/the separator 10/the unit stack U1 including the positive electrode 20, the separator 10, the negative electrode 30, the separator 10, and the positive electrode 20 that are sequentially stacked in this stated order/the separator 10/the unit stack U2 including the negative electrode 30, the separator 10, and the positive electrode 20, the separator 10, the negative electrode 30 that are sequentially stacked in this stated order/the separator 10/the 3D porous current collector-including positive electrode 40.

In some embodiments of the present invention, the electrode assembly 100 may have a sequentially stacked structure of the 3D porous current collector-including positive electrode 40/the separator 10/the unit stack U1 including the negative electrode 30, the separator 10, the positive electrode 20, the separator 10, and the negative electrode 30 that are sequentially stacked in this stated order/the separator 10/the unit stack U2 including the positive electrode 20, the separator 10, the negative electrode 30, the separator 10, and the positive electrode 20 that are sequentially stacked in this stated order/the separator 10/the 3D porous current collector-including negative electrode 50.

At least one of the electrodes in the unit stack U1 and U2 may be a 3D porous current collector-including electrode, in addition to the lowermost electrode and/or the uppermost electrode of the electrode assembly 100. In the electrode assembly 100, when some electrodes of the unit stacks U1 and U2 include the 3D porous current collector, as well as the lowermost electrode and/or the uppermost electrode include the 3D porous current collector, the capacity and energy density of a battery including the electrode assembly 100 may increase due to a decrease in irreversible capacity and a decrease in thickness of the battery.

In some embodiments, the electrode assembly 100 may include a plurality of unit stacks, wherein each of the unit stacks includes a 3D porous current collector-including electrode, and may have a structure including electrodes including 3D porous current collectors, wherein each of the electrodes including the 3D porous current collector included in each of the unit stacks has a consecutively stacked structure with the separator between the unit stacks. Here, the electrodes including the 3D porous current collector have a consecutively stacked structure with the separator in the middle (e.g., with the separator between adjacent ones of the electrodes of the unit stacks), and the electrodes on and under the separator may have opposite polarities. In particular, the electrode may have a sequentially stacked structure of a 3D porous current collector-including negative electrode/a separator/a 3D porous current collector-including positive electrode, or vice versa.

Alternatively, the electrode assembly 100 may include a plurality of unit stacks, wherein each of the unit stacks includes a 3D porous current collector-including electrode, wherein each of the electrodes including the 3D porous current collector included in each of the unit stacks has a consecutively stacked structure without the separator between the unit stacks, and the consecutively stacked electrodes may have the same polarity. In particular, the electrode may have a sequentially stacked structure of a 3D porous current collector-including negative electrode/a 3D porous current collector-including negative electrode.

As shown in FIG. 5, both the uppermost electrode and the lowermost electrode of the electrode assembly 100 may be the 3D porous current collector-including negative electrode 50, and each of the unit stacks U1 and U2 may include the 3D porous current collector-including positive electrode 40 and the 3D porous current collector-including negative electrode 50. In some embodiments, electrodes of the unit stacks other than the electrodes shown in FIG. 5 may be a 3D porous current collector-including electrode.

The electrode assembly 100 may have a structure including a 3D porous current collector-including negative electrode 50/a separator 10/a unit stack U1 including a positive electrode 20, a separator 10, a negative electrode 30, a separator 10, and a 3D porous current collector-including positive electrode 40 that are sequentially stacked/a separator 10/a unit stack U2 including a 3D porous current collector-including negative electrode 50, a separator 10, a positive electrode 20, a separator 10, and a negative electrode 30 that are sequentially stacked/a separator 10/a 3D porous current collector-including positive electrode 40 that are sequentially stacked. For example, the electrode assembly 100 may have a structure including a 3D porous current collector-including positive electrode 40 that forms a unit stack U1 and a 3D porous current collector-including negative electrode 50 that forms a unit stack U2, wherein the positive electrode 40 and the negative electrode 50 are continuously stacked from a separator 10.

In some embodiments of the present invention, the electrode assembly 100 may have a structure including a positive electrode 40/a separator 10/a unit stack U1 including a negative electrode 30, a separator 10, a positive electrode 20, a separator 10, and a 3D porous current collector-including negative electrode 50 that are sequentially stacked/a separator 10/a unit stack U2 including a 3D porous current collector-including positive electrode 40, a separator 10, a negative electrode 30, a separator 10, and a positive electrode 20 that are sequentially stacked/a separator 10/a 3D porous current collector-including negative electrode 50 that are sequentially stacked.

As shown in FIG. 6, the uppermost electrode and the lowermost electrode of the electrode assembly 100 may be a 3D porous current collector-including negative electrode, and each of the unit stacks U1 and U2 may include a 3D porous current collector-including positive electrode 40.

The electrode assembly 100 may have a structure including a 3D porous current collector-including negative electrode 50/a separator 10/a unit stack U1 including a positive electrode 20, a separator 10, a negative electrode 30, a separator 10, and a 3D porous current collector-including positive electrode 40 that are sequentially stacked/a unit stack U2 including a 3D porous current collector-including positive electrode 40, a separator 10, a negative electrode 30, a separator 10, and a positive electrode 20 that are sequentially stacked/a separator 10/a 3D porous current collector-including negative electrode 50 that are sequentially stacked. A separator may not be disposed between the unit stack U1 and the unit stack U2.

In some embodiments of the present invention, the electrode assembly 100 may have a structure including a 3D porous current collector-including positive electrode 40/a separator 10/a unit stack U1 including a negative electrode 30, a separator 10, a positive electrode 20, a separator 10, and a 3D porous current collector-including negative electrode 50 that are sequentially stacked/a unit stack U2 including a 3D porous current collector-including negative electrode 50, a separator 10, a positive electrode 20, a separator 10, and a negative electrode 30 that are sequentially stacked/a separator 10/a 3D porous current collector-including positive electrode 40 that are sequentially stacked.

FIGS. 1, 2, 3, 4, 5, and 6 show electrode assemblies that include only one or two unit stacks U1 and U2, but embodiments of the present invention are not limited there to and, in some embodiments, an electrode assembly may include three or more unit stacks.

Figure 7:
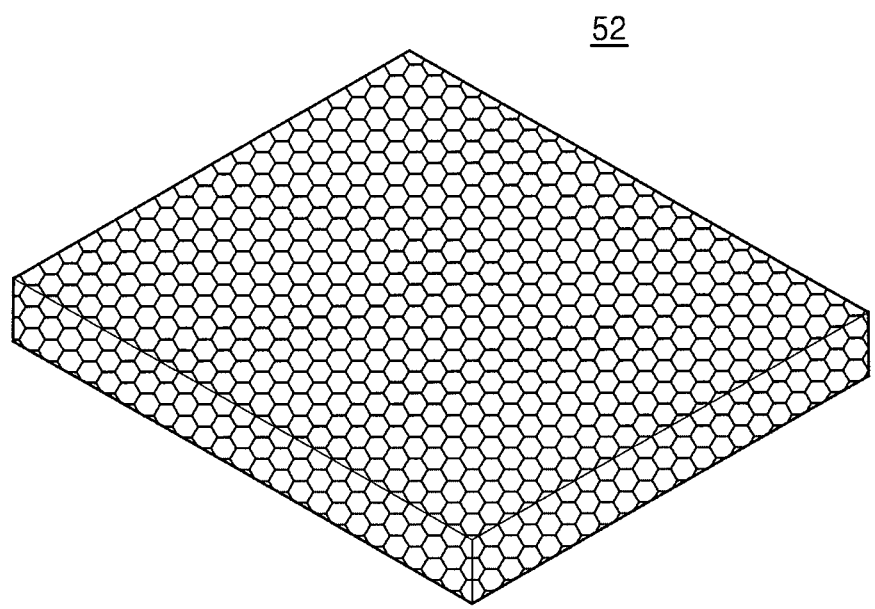
FIG. 7 is a schematic view of a 3-dimensional (3D) porous negative electrode current collector according to an exemplary embodiment of the present invention.
Figure 8:
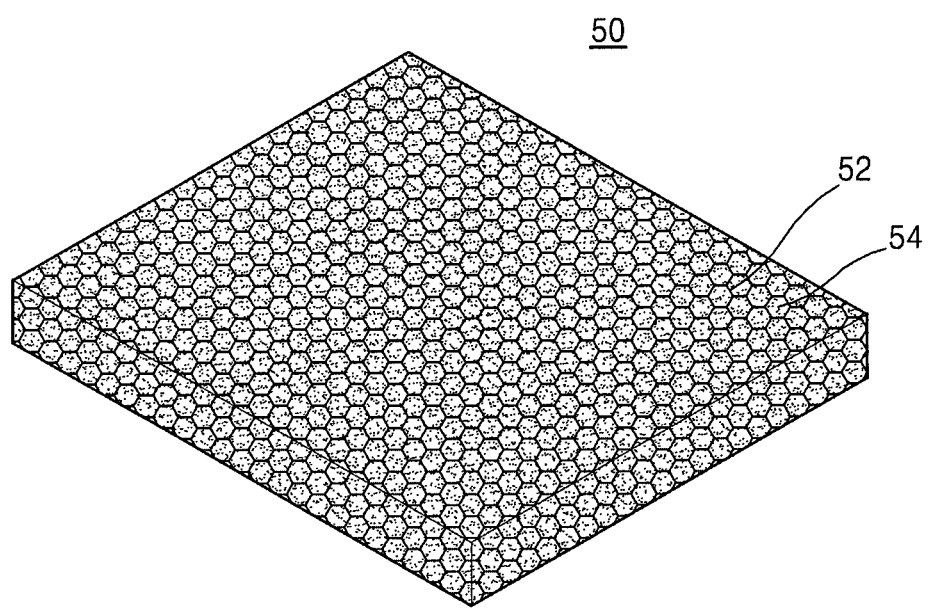
FIG. 8 is a schematic view of a 3D porous current collector-containing negative electrode, according to an exemplary embodiment of the present invention.

FIG. 7 shows a schematic view of a 3D porous negative electrode current collector according to an exemplary embodiment, and FIG. 8 shows a schematic view of a 3D porous current collector-including negative electrode. FIGS. 7 and 8 show negative electrodes, but, in some embodiments, the electrode may be a positive electrode.

Referring to FIG. 7, the 3D porous current collector 52 is a porous material having pores therein. For example, the 3D porous current collector 52 has a 3D shape with pores, and any material available as a current collector in the art may be used.

For example, the 3D porous current collector 52 may be in the form of metal foam.

For example, the 3D porous current collector 52 may include at least one selected from aluminum (Al), titanium (Ti), vanadium (V), chromium (Cr), manganese (Mn), iron (Fe), cobalt (Co), nickel (Ni), copper (Cu), zinc (Zn), zirconium (Zr), niobium (Nb), silver (Ag), tungsten (W), platinum (Pt), steel use stainless (SUS), and a combination thereof, or may be formed of at least one selected therefrom.

When the 3D porous current collector-including electrode is a negative electrode, the 3D porous current collector may include Cu foam. When the 3D porous current collector-including electrode is a positive electrode, the 3D porous current collector may include Al foam. For example, when the 3D porous current collector-including electrode is a negative electrode, the 3D porous current collector may be Cu foam, and when the 3D porous current collector-including electrode is a positive electrode, the 3D porous current collector may be Al foam.

For example, a thickness of the 3D porous current collector 52 may be in a range of about 10 μm to about 500 μm. In particular, for example, a thickness of the 3D porous current collector 52 may be in a range of about 50 μm to about 500 μm. For example, a thickness of the 3D porous current collector 52 may be in a range of about 50 μm to about 200 μm. When a thickness of the 3D porous current collector 52 included in the electrode is within these ranges, a battery including the electrode at an uppermost and/or a lowermost may have a reduced irreversible capacity.

For example, a pore diameter of the 3D porous current collector 52 may be in a range of about 0.2 μm to about 100 μm, and a porosity of the 3D porous current collector 52 may be in a range of about 50% to about 98%.

Referring to FIG. 8, the electrode (e.g., the negative electrode 50) including the 3D porous current collector 52 having a porous diameter and a porosity within these ranges, the electrode includes an appropriate amount of the electrode active material 54 inside the pores of the 3D porous current collector 52, and thus a battery including the electrode may have a reduced irreversible capacity and, as a result, may exhibit the desired capacity.

According to another embodiment, a lithium battery may include the stack-type electrode assembly.

Hereinafter, a method of preparing the lithium battery according to one embodiment of the present invention will be described.

According to one embodiment, the 3D porous current collector-including positive electrode may be prepared as follows.

First, a 3D porous current collector is prepared. Next, a positive active material, as an electrode active material, a binder, and, optionally, a conducting agent are mixed in a solvent to prepare a positive active material composition. The pores of the 3D porous current collector may be filled with the positive active material composition, or the 3D porous current collector may be coated with the positive active material composition and then pressed and dried to allow the positive active material composition to penetrate into the pores of the 3D porous current collector, thereby preparing a positive electrode including the positive active material in the pores of the 3D porous current collector.

The positive active material may be any material available as a positive active material in the art. For example, the positive active material may be a compound that is represented by one formula selected from $Li_aA_{1-b}B_bD_2$ (where, $0.90 \leq a \leq 1$ and $0 \leq b \leq 0.5$); $Li_aE_{1-b}B_bO_{2-c}D_c$ (where, $0.90 \leq a \leq 1$, $0 \leq b \leq 0.5$, and $0 \leq c \leq 0.05$); $LiE_{2-b}B_bO_{4-c}D_c$ (where, $0 \leq b \leq 0.5$ and $0 \leq c \leq 0.05$); $Li_aNi_{1-b-c}Co_bB_cD_\alpha$ (where, $0.90 \leq a \leq 1$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (where, $0.90 \leq a \leq 1$, $0 \leq b \leq 0.5$, $0 \leq c \leq 0.05$, and $0 < \alpha < 2$); $Li_aNi_{1-b-c}Co_bB_cO_{2-\alpha}F_2$ (where, $0.90 \leq a \leq 1$, $0 \leq b \leq 0.5$, $0 \leq c \leq 0.05$, and $0 < \alpha < 2$); $Li_aNi_{1-b-c}Mn_bB_cD_\alpha$ (where, $0.90 \leq a \leq 1$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where, $0.90 \leq a \leq 1$, $0 \leq b \leq 0.5$, $0 \leq c \leq 0.05$, and $0 < \alpha < 2$); $Li_aNi_{1-b-c}Mn_bB_cO_{2-\alpha}F_2$ (where, $0.90 \leq a \leq 1$, $0 \leq b \leq 0.5$, $0 \leq c \leq 0.05$, and $0 < \alpha < 2$); $Li_aNi_bE_cG_dO_2$ (where, $0.90 \leq a \leq 1$, $0 \leq b \leq 0.9$, $0 \leq c \leq 0.5$, and $0.001 \leq d \leq 0.1$); $Li_aNi_bCo_cMn_dG_eO_2$ (where, $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where, $0.90 \leq a \leq 1$ and $0.001 \leq b \leq 0.1$); $Li_aCoG_bO_2$ (where, $0.90 \leq a \leq 1$ and $0.001 \leq b \leq 0.1$); $Li_aMnG_bO_2$ (where, $0.90 \leq a \leq 1$ and $0.001 \leq b \leq 0.1$); $Li_aMn_2G_bO_4$ (where, $0.90 \leq a \leq 1$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where, $0 \leq f \leq 2$); $Li_{(3-f)}Fe_2(PO_4)_3$ (where, $0 \leq f \leq 2$); and $LiFePO_4$.

In the formulae above, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

For example, the positive active material may be $LiCoO_2$, $LiMn_xO_{2x}$ (x=1, 2), $LiNi_{1-x}Mn_xO_{2x}$ (0<x<1), $LiNi_{1-x-y}Co_{x-}Mn_yO_2$ ($0 \leq x \leq 0.5$, $0 \leq y \leq 0.5$), or $FePO_4$.

The binder in the positive active material composition binds the positive active material and the conducting agent or the positive active material and the current collector, and an amount of the binder may be in a range of about 1 part to about 50 parts by weight based on 100 parts by weight of the positive active material. For example, an amount of the binder may be in a range of about 1 part to about 30 parts by weight, about 1 part to about 20 parts by weight, or about 1 part to about 15 parts by weight based on 100 parts by weight of the positive active material. Examples of the binder may include polyvinylidene fluoride (PVDF), polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polystyrene, polymethylmethacrylate, polyaniline, acrylonitrile butadiene styrene, phenol resin, epoxy resin, polyethylene terephthalate, polytetrafluoroethylene, polyphenylene sulfide, polyamideimide, polyetherimide, polyethylenesulfone, polyamide, polyacetal, polyphenylene oxide, polybutylene terephthalate, ethylene-propylene-diene monomer (EPDM), sulfonated EPDM, styrene butadiene rubber, fluoride rubber, and a combination thereof, but embodiments are not limited thereto.

The conducing agent may be any conducting agent generally used in a lithium battery. Examples of the conducting agent may include a carbon-based material such as carbon black, acetylene black, ketjen black, or carbon fiber; a metal-based material such as a metal powder or metal fiber of copper, nickel, aluminum, or silver; a conductive polymer such as a polyphenylene derivative; or a conducting agent including a mixture thereof. An amount of the conducting agent may be appropriately controlled. For example, a weight ratio of the positive active material and the conducting agent may be in a range of about 99:1 to about 90:10.

Examples of the solvent may include N-methylpyrrolidone (NMP), acetone, and water. An amount of the solvent may be in a range of about 1 part to about 40 parts by weight based on 100 parts by weight of the positive active material. When the amount of the solvent is within this range, an active material layer may be easily formed.

Next, the 3D porous current collector-including negative electrode 50 may be prepared by using the same method for preparing the 3D porous current collector-including positive electrode, except that a negative active material was used as an electrode active material. Also, a binder, a conducting agent, and a solvent used to prepare a negative active material composition were the same as defined in the preparation of the positive electrode.

The negative active material may be any material generally used in the art. Examples of the negative active material may include lithium metal, a metal that is alloyable with lithium, a transition metal oxide, a non-transition metal oxide, and a carbonaceous material.

Examples of the metal that is alloyable with lithium may include Si, Sn, Al, Ge, Pb, Bi, Sb, a Si—Y alloy (where, Y is an alkali metal, an alkali earth metal, a Group 13 element, a Group 14 element, a transition metal, a rare-earth element, or a combination thereof, but not Si), and a Sn—Y alloy (where, Y is an alkali metal, an alkali earth metal, a Group 13 element, a Group 14 element, a transition metal, a rare-earth element, or a combination thereof, but not Sn). The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Examples of the transition metal oxide may include a lithium titanium oxide, a vanadium oxide, and a lithium vanadium oxide.

Examples of the non-transition metal oxide may include $SnO_2$ and $SiO_x$ (where, 0<x<2).

Examples of the carbonaceous material may include crystalline carbon, amorphous carbon, and a mixture thereof. Examples of the crystalline carbon may include natural graphite and artificial graphite, each of which has an amorphous shape, a plate shape, a flake shape, a spherical shape, or a fiber shape. Examples of the amorphous carbon may include soft carbon, hard carbon, meso-phase pitch carbide, and calcined cokes.

Next, the positive electrode 20 may be prepared by molding the positive active material composition into a certain shape or by coating a non-porous positive electrode current collector 22 with the positive active material composition to form a positive active material layer 24 on at least one surface of the current collector. Also, the negative electrode 30 may be prepared by molding the negative active material composition into a certain shape or by coating a non-porous positive electrode current collector 32 with the negative active material composition to form a negative active material layer 34 on at least one surface of the current collector.

The non-porous positive electrode and negative electrode current collectors 22 and 32 may be each independently a current collector that does not generate a chemical change to a battery and has high conductivity. For example, the current collector may be formed of at least one selected from aluminum, copper, nickel, titanium, and stainless steel. A surface of aluminum, copper, nickel, or stainless steel may be treated with a coating component such as nickel, copper, aluminum, titanium, gold, silver, platinum, or palladium by electroplating or ion deposition. Alternatively, the surface of aluminum, copper, nickel, or stainless steel may be coated with nanoparticles of the coating component by performing a dipping or pressing technique and used as a substrate. In some embodiments, the current collector may include a base formed of a non-conductive material coated with the conductive material stated above. The current collector may have an uneven micro structure at its surface to enhance a binding force with the active material layer on the substrate. Also, a thickness of the current collector may be generally in a range of about 10 μm to about 30 μm.

Next, a stack-type electrode assembly may be prepared by sequentially stacking a lowermost electrode/a separator/at least one unit stack/a separator/an uppermost electrode in this stated order.

Here, the positive active materials used in preparation of the positive electrodes may be identical to or different from each other, and the negative active materials used in preparation of the negative electrodes may be identical to or different from each other.

The separator may be any separator typically used in a lithium battery. In particular, the separator may include a material that has a low resistance to migration of ions of an electrolyte and an excellent electrolytic solution-retaining capability. For example, the separator may include a material selected from glass fiber, polyester, Teflon, polyethylene, polypropylene, polytetrafluoroethylene (PTFE), and a combination thereof, each of which may be non-woven or woven. The separator may have a pore diameter in a range of about 0.01 μm to about 10 μm, and a thickness in a range of about 5 μm to about 300 μm. When the pore diameter and the thickness of the separator are within these ranges, a reduction in a capacity of a battery per unit volume may be reduced, and safety in case of inner short-circuit may be secured. For example, a thickness of the separator may be in a range of about 8 μm to about 30 μm.

Then, the stack-type electrode assembly may be accommodated in a case having a shape of a rectangle or a cylinder, and an electrolyte may be injected into the case, thereby completing manufacture of a lithium battery.

Here, the electrolyte may include a non-aqueous electrolyte and a lithium salt. Examples of the non-aqueous electrolyte may include a non-aqueous electrolyte solution and an organic solid electrolyte.

Examples of the non-aqueous electrolyte solution may be a non-aprotic organic solvent, and examples of the non-aprotic organic solvent may include N-methyl-2-pyrrolidone, propylene carbonate (PC), ethylene carbonate (EC), butylene carbonate, dimethyl carbonate (DMC), diethyl carbonate (DEC), ethylmethyl carbonate (EMC), gamma-butyrolactone (GBL), 1,2-dimethoxy ethane (DME), tetrahydrofuran (THF), 2-methyltetrahydrofuran, dimethyl sulfoxide (DMSO), 1,3-dioxolane (DOL), formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte may include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

The lithium salt may be any lithium salt commonly used in a lithium battery, and soluble in the lithium salt-containing non-aqueous electrolyte. For example, the lithium salt may include at least one selected from LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carbonate, lithium tetraphenyl borate, and lithium imide.

Also, the electrolyte solution may include vinylene carbonate (VC) or catechol carbonate (CC) to form and maintain an SEI layer on a surface of the negative electrode. Optionally, the electrolyte may include a redox-shuttle type additive such as n-butylferrocene or halogen-substituted benzene to prevent overcharge of the battery. Optionally, the electrolyte may include an additive for forming a film such as cyclohexylbenzene or biphenyl. Optionally, the electrolyte may include a cation receptor such as a crown ether compound and an anion receptor such as a boron-based compound to improve conduction characteristics. Optionally, the electrolyte may include a phosphate-based compound such as trimethyl phosphate (TMP), tris(2,2,2-trifluoroethyl)phosphate (TFP), or hexamethoxycyclotriphosphazene (HMTP) as a flame retardant.

In some embodiments, in order to further improve safety of a lithium battery by assisting formation of a stable SEI layer or a thin film on a surface of the electrode, the electrolyte may further include an additive, and examples of the additive may include tris(trimethylsilyl)phosphate (TMSPa), lithium difluorooxalatoborate (LiFOB), propanesultone (PS), succinonitrile (SN), LiBF$_4$, a silane compound having a functional group that may form a siloxane bond with, for example, an acryl group, an amino group, an epoxy group, a methoxy group, or a vinyl group, and silazanes such as hexxamethyldisilazane. In particular, the additive may be propanesultone (PS), succinonitrile (SN), or LiBF$_4$.

For example, the electrolyte may be prepared by adding a lithium salt, such as LiPF$_6$, LiClO$_4$, LiBF$_4$, or LiN(SO$_2$CF$_3$)$_2$, to a mixture solvent including a cyclic carbonate, such as EC or PC, which is a high dielectric solvent; and a linear carbonate, such as DEC, DMC, or EMC, which is a low viscosity solvent.

The lithium battery has good lifespan characteristics and high rate characteristics, and thus may be used in an electric vehicle (EV). For example, the lithium battery may be used in a hybrid vehicle such as a plug-in hybrid electric vehicle (PHEV). Also, the lithium battery may be suitable for electric bikes, electric tools, and all other uses requiring a high output, a high voltage, and high temperature operability.

The lithium battery may be a lithium secondary battery.

One or more embodiments will now be described in more detail with reference to the following examples. However, these examples are not intended to limit the scope of the one or more embodiments.

EXAMPLE 1

(Preparation of 3D Porous Current Collector-including Negative Electrode)

A Cu foam (available from Duocel®) having a thickness of about 90 μm was prepared as a 3D porous current collector. Also, 98 wt % of graphite (available from Shanghai Shan Shan), as a negative active material, and 2 wt % of SBR (available from Zeon), as a binder, were mixed in N-methylpyrrolidone, as a solvent, to prepare a negative active material composition. The negative active material composition was applied on the Cu foam to allow the negative active material composition to penetrate into pores of the Cu foam, and the resultant was dried to prepare a negative electrode having a thickness of about 90 μm.

(Preparation of Positive Electrode)

97.5 wt % of LiCoO$_2$ (available from Umicore), as a positive active material, 1 wt % of carbon black (product name: ECP, available from Lion), as a conducting agent, and 1.5 wt % of PVdF (product name: Solef, available from Solvay), as a binder, were mixed to prepare a positive active material composition. The active material composition thus prepared was coated, dried, and pressed on two surfaces of an aluminum foil current collector having a thickness of about 15 μm gill, and thus a positive electrode having a thickness of about 120 μm was prepared.

(Preparation of Negative Electrode)

98 wt % of graphite (available from Shanghai Shan Shan), as a negative active material, and 2 wt % of SBR (available from Zeon), as a binder, were mixed in N-methylpyrrolidone, as a solvent, to prepare a negative active material composition. The active material composition thus prepared was coated, dried, and pressed on two surfaces of a copper foil current collector having a thickness of about 10 μm, and thus a positive electrode having a thickness of about 145 μm was prepared.

(Preparation of Electrode Assembly)

A separator formed of a polyethylene (PE) film (available from Toray) was prepared. As shown in FIG. 3, a negative electrode, the separator, the positive electrode prepared as described above, the separator, the negative electrode prepared as described above, the separator, the positive electrode prepared as described above, the separator, and the 3D porous current collector-including negative electrode prepared as described above were sequentially stacked in this stated order to prepare an electrode assembly.

(Preparation of Lithium Secondary Battery)

The electrode assembly was accommodated in a pouch-type case, and then an electrolyte prepared by adding 1.3 M of $LiPF_6$ to a mixture solvent including ethylene carbonate (EC), ethylmethyl carbonate (EMC), and dimethyl carbonate (DMC) at a volume ratio of 1:1:1 was injected into the case to prepare a lithium secondary battery of a pouch-type.

EXAMPLE 2

(Preparation of 3D Porous Current Collector-including Positive Electrode)

An Al foam (available from Duocel®) having a thickness of about 150 μm was prepared as a 3D porous current collector. Also, 97.5 wt % of $LiCoO_2$ (available from Umicore), as a positive active material, 1 wt % of carbon black (product name: ECP, available from Lion), as a conducting agent, and 1.5 wt % of PVdF (product name: Solef, available from Solvay), as a binder, were mixed in N-methylpyrrolidone, as a solvent, to prepare a positive active material composition. The positive active material composition was applied on the Al foam to allow the positive active material composition to penetrate into pores of the Al foam, and the resultant was dried to prepare an positive electrode having a thickness of about 150 μm.

Also, a 3D porous current collector-including negative electrode, a positive electrode, and a negative electrode were prepared in the same manner as in Example 1.

(Preparation of Electrode Assembly)

A separator formed of a polyethylene (PE) film (available from Toray) was prepared. As shown in FIG. 4, the 3D porous current collector-including negative electrode, the separator, the positive electrode prepared as described above, the separator, the negative electrode prepared as described above, the separator, the positive electrode prepared as described above, the separator, the negative electrode prepared as described above, the separator, the positive electrode prepared as described above, the separator, the negative electrode prepared as described above, the separator, and the 3D porous current collector-including positive electrode prepared as described above were sequentially stacked in this stated order to prepare an electrode assembly.

(Preparation of Lithium Secondary Battery)

The electrode assembly was accommodated in a pouch-type case, and then an electrolyte prepared by adding 1.3 M of $LiPF_6$ to a mixture solvent including ethylene carbonate (EC), ethylmethyl carbonate (EMC), and dimethyl carbonate (DMC) at a volume ratio of 1:1:1 was injected into the case to prepare a lithium secondary battery of a pouch-type.

COMPARATIVE EXAMPLE 1

A lithium battery was prepared in the same manner as in Example 1, except that the negative electrode prepared in Example 1 by using the Cu foil current collector was used instead of the 3D porous current collector-including negative electrode.

COMPARATIVE EXAMPLE 2

A lithium battery was prepared in the same manner as in Example 1, except that the 3D porous current collector-including negative electrode was used instead of the negative electrode, and the 3D porous current collector-including positive electrode prepared in Example 2 was used instead of the positive electrode.

COMPARATIVE EXAMPLE 3

A lithium battery was prepared in the same manner as in Example 2, except that the negative electrode prepared in Example 1 by using the Cu foil current collector was used instead of the 3D porous current collector-including negative electrode, and the positive electrode prepared in Example 1 by using the Al foil current collector was used instead of the 3D porous current collector-including positive electrode.

COMPARATIVE EXAMPLE 4

A lithium battery was prepared in the same manner as in Example 2, except that the 3D porous current collector-including negative electrode was used instead of the negative electrode, and the 3D porous current collector-including positive electrode was used instead of the positive electrode.

EVALUATION EXAMPLE 1

Capacity and Energy Density Measurement of Lithium Battery

In order to test whether an irreversible capacity of the lithium battery decreases or not, the lithium secondary batteries prepared in Examples 1 and 2 and Comparative Examples 1, 2, 3, and 4 were charged at a constant current mode (CC mode) of 0.2 C rate until a voltage reached a charging cutoff voltage of about 4.3 V (vs. Li) at a temperature of 25° C., and charged at a constant voltage mode (CV mode) while maintaining the voltage at 4.3 V until a current reached 0.05 C rate. Then, the batteries were discharged at a constant current mode of 0.2 C until a discharge cutoff voltage of 3.0 V. Next, capacities and energy densities of the lithium secondary batteries prepared in Examples 1 and 2 and Comparative Examples 1, 2, 3, and 4 were measured, and the results are shown in Table 1.

TABLE 1

| | Number of unit stacks | Electrode including 3D porous current collector | Capacity (mAh/g) | Energy density (mWh/g) |
|---|---|---|---|---|
| Example 1 | 1 | Lowermost electrode and uppermost electrode | 79.4 | 117.7 |
| Example 2 | 2 | Lowermost electrode and uppermost electrode | 158.8 | 139.1 |
| Comparative Example 1 | 1 | None | 75.3 | 100 |
| Comparative Example 2 | 1 | All electrode | 150.6 | 103.1 |
| Comparative Example 3 | 2 | None | 75.3 | 85.9 |
| Comparative Example 4 | 2 | All electrode | 150.6 | 97.6 |

As shown in Table 1, when the lowermost electrode and the uppermost electrode are the 3D porous current collector-including electrode, a capacity and an energy density of the battery including the lowermost electrode and the uppermost electrode may be better than those of batteries that do not have a 3D porous current collector-including electrode (Comparative Examples 1 and 3) or those of batteries that only include a 3D porous current collector-including electrode (Comparative Examples 2 and 4).

As described above, according to the one or more of the above embodiments, a lithium battery may have increased capacity and improved energy density by including a stack-type electrode assembly, wherein a 3D porous current collector-including electrode is located at an uppermost and/or a lowermost of the electrode assembly.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A stack-type electrode assembly comprising: a lowermost electrode in a lowermost portion of the electrode assembly;
an uppermost electrode in an uppermost portion of the electrode assembly; at least one unit stack between the lowermost electrode and the uppermost electrode, the at least one unit stack comprising a positive electrode; a negative electrode; and a separator disposed between the positive electrode and the negative electrode; and
a plurality of separators respectively positioned between the lowermost electrode and the at least one unit stack, and between the at least one unit stack and the uppermost electrode,
wherein the lowermost electrode and/or the uppermost electrode is an electrode comprising a 3-dimensional (3D) porous current collector,
wherein each electrode other than the electrode or electrodes comprising the 3D porous current collector comprises:
a non-porous electrode current collector; and an electrode active material layer on at least one surface of the non-porous electrode current collector, and
wherein each electrode other than the electrode or electrodes comprising the 3D porous current collector does not include a 3D porous current collector.

2. The stack-type electrode assembly of claim 1, wherein the lowermost electrode and the uppermost electrode both comprise the 3D porous current collector.

3. The stack-type electrode assembly of claim 1, wherein the electrode or electrodes comprising the 3D porous current collector further comprises an electrode active material in pores of the 3D porous current collector.

4. The stack-type electrode assembly of claim 1, wherein the non-porous electrode current collector is in the form of a metal foil.

5. The stack-type electrode assembly of claim 1, wherein the at least one unit stack has a bi-cell structure, wherein the bi-cell structure comprises the negative electrode, the separator, the positive electrode, a second separator, and a second negative electrode that are sequentially stacked in this stated order, or
wherein the bi-cell structure comprises the positive electrode, the separator, the negative electrode, the second separator, and a second positive electrode, that are sequentially stacked in this stated order.

6. The stack-type electrode assembly of claim 1, wherein the at least one unit stack has a full-cell structure, wherein the full-cell structure comprises the positive electrode, the separator, and the negative electrode that are sequentially stacked in this stated order.

7. The stack-type electrode assembly of claim 1, wherein the electrodes having opposite polarities are stacked to face each other with the separator therebetween.

8. The stack-type electrode assembly of claim 1, wherein the 3D porous current collector is a metal foam.

9. The stack-type electrode assembly of claim 1, wherein the 3D porous current collector comprises at least one selected from aluminum (Al), titanium (Ti), vanadium (V), chromium (Cr), manganese (Mn), iron (Fe), cobalt (Co), nickel (Ni), copper (Cu), zinc (Zn), zirconium (Zr), niobium (Nb), silver (Ag), tungsten (W), platinum (Pt), steel use stainless (SUS), and a combination thereof.

10. The stack-type electrode assembly of claim 1, wherein, when the electrode comprising the 3D porous current collector is a negative electrode, the 3D porous current collector comprises Cu foam, and, when the electrode comprising the 3D porous current collector is a positive electrode, the 3D porous current collector comprises Al foam.

11. The stack-type electrode assembly of claim 1, wherein a thickness of the 3D porous current collector is in a range of about 10 μm to about 500 μm.

12. The stack-type electrode assembly of claim 1, wherein a thickness of the 3D porous current collector is in a range of about 50 μm to about 200 μm.

13. The stack-type electrode assembly of claim 1, wherein a pore diameter of the 3D porous current collector is in a range of about 0.2 μm to about 100 μm.

14. The stack-type electrode assembly of claim 1, wherein a porosity of the 3D porous current collector is in a range of about 50% to about 98%.

15. The stack-type electrode assembly of claim 1, wherein the at least one unit stack comprises one or two unit stacks.

16. A lithium battery comprising the stack-type electrode assembly of claim 1.

\* \* \* \* \*